US005554421A

United States Patent [19]

Delisle et al.

[11] Patent Number: 5,554,421

[45] Date of Patent: Sep. 10, 1996

[54] INSULATING MULTIPLE LAYER SEALED UNITS AND INSULATING SPACER AND ASSEMBLY

[76] Inventors: France Delisle, 228, de la Colline, Alma, Quebec, Canada, G8B 5V2; James Boudreault, 485, Mgr de Laval, Baie St-Paul, Quebec, Canada, G0A 1B0

[21] Appl. No.: 480,319

[22] Filed: Jun. 7, 1995

Related U.S. Application Data

[62] Division of Ser. No. 160,152, Dec. 2, 1993.

[30] Foreign Application Priority Data

Sep. 2, 1993 [CA] Canada ................................. 2105460

[51] Int. Cl.[6] ................................................ B29D 5/02

[52] U.S. Cl. ........................ 428/34.1; 428/192; 428/220; 428/595; 49/475.1; 49/479.1; 52/786.1; 52/786.11; 52/786.13

[58] Field of Search .................................. 428/34.1, 192, 428/220, 595; 52/788–790; 49/475.1, 479.1

[56] References Cited

U.S. PATENT DOCUMENTS

| | | | |
|---|---|---|---|
| 2,097,927 | 11/1937 | Klemp | 428/595 |
| 2,867,862 | 1/1959 | Squire | 49/479.1 |
| 4,368,226 | 1/1983 | Mucaria | 428/34 |
| 4,543,297 | 9/1985 | Saurenman | 428/582 |
| 4,649,685 | 3/1987 | Wolf et al. | 52/398 |
| 4,658,553 | 4/1987 | Shinagawa | 52/172 |
| 5,017,252 | 5/1991 | Aldrich et al. | 156/109 |
| 5,156,894 | 10/1992 | Hood et al. | 428/34 |

*Primary Examiner*—James J. Seidleck
*Assistant Examiner*—Michael A. Williamson
*Attorney, Agent, or Firm*—Oblon, Spivak, McClelland, Maier & Neustadt, P.C.

[57] ABSTRACT

A spacer for use in connecting the edges of two or more panes of insulating glass, panel walls or the like. The spacer is extruded as one material and is formed with retaining lips (external and internal). The present invention improves actual window systems by having an innovative shape of material providing a precise thickness, a new technique of spacer frame preparation, novel external lips to increase the strength of assembly and being capable of being utilized in most of todays multi-pane glazing assemblies. The body of the spacer is made of Polyvinyl chloride(PVC) with an appropriate mineral type filler providing better insulation, ease of production techniques and low cost of production. Together these innovations provide exceptional insulation, adhesion characteristics and weather resistance when utilized with proper sealant and desiccant material.

2 Claims, 4 Drawing Sheets

INSULATING MULTIPLE LAYER SEALED UNITS AND INSULATING SPACER AND ASSEMBLY

This is a Division of application Ser. No. 08/160,152 filed on Dec. 2, 1993.

TECHNICAL FIELD

This invention relates generally to a spacer for multi-pane glazing structures, and more particularly relates to a new type of spacer for its shape and type of material used. The invention also relates to structures having exceptional thermal insulation performance by using the spacer.

BACKGROUND/PRIOR ART

Multi-pane glazing structures have been in use for some time, since they have replaced single-pane windows, as thermally insulating windows, in industrial, commercial, and residential situations. Spacers used in the glazing structures have been made of aluminum, galvanized steel, plastic, polymer, rubber and other soft or hard materials, sometimes used alone and sometimes combined with each other. Spacer bars are set along the periphery of the space between the panes and are typically long hollow perforated metal sections. Aluminum alloy spacers (extruded or rolled from flat strip material) are still the most utilized spacers (other popular spacers are made of galvanized steel or silicone compound), due to low cost and ease of manufacturing. In most cases the hollow interior of the spacer contains a desiccant material which absorbs any moisture that may enter into the sealed unit and/or soak up any residual moisture that may have been in the enclosed air or low-conductive gas within the sealed unit.

Recent increases in energy costs as well as demand for a superior product have given rise to the need for windows and other multi-pane glazing structures of even higher thermal insulation ability.

To achieve what todays markets require, different approaches have been taken to increase the window's thermal insulation performance, Additional panes have been incorporated into laminated structures, giving approximately R-1 for a single pane, R-2 for a double pane and R-3 for 3 or more panes. (Reference ASTM.)

Heat-reflective, low-emissivity ("low e") coatings have been incorporated into window structure. Special multi-pane glazing structure have been developed, as for example, in U.S. Pat. No 5,156,894 to Hood et al. (high performance, thermally insulating multi-pane glazing structure.)

Low heat transfer gas have been incorporated into the window structure. (to mention some: argon, krypton, nitrogen, etc.)

Spacers have evolved from steel and aluminum to lower coefficient of heat transfer material such as polymer plastic, fiberglass and rubber. The aim was to get away from metal spacers having too high of a thermal conductivity coefficient thus causing condensation on the inner surface of the multi-pane assembly when temperature is below the dew point. In most cases a high increase in cost of manufacturing render these products hard to market. Also a problem with reinforced plastic spacers was that they generally had a different coefficient of expansion than glass generating early failure of the sealed unit. Moreover, reinforced plastic spacers caused problems with permeability, either permitting vapor moisture to enter or the filling gas to escape. Generally one spacer assembly is made of four lengths of spacers mechanically fastened with corner joints, inserted under pressure. Other techniques include folding around the corner with or without notching the spacer or a complete cutting of the spacer after which the length of spacer is thermally welded or by other means jointed together without a mechanical joint. Once the panes have been put in place on each side of the spacer assembly, a sealant is applied to the outside of that particular assembly to seal and to adhere to the outermost area of the spacer frame and to the panes surface area facing the spacer frame and outside it.

Common sealing materials used for this type of assembly are generally made of compounds subject to undergoing polymerization by catalysis. These sealants are polysulfide derivatives of the urethane family. Polysulfide is used as a simple sealant or in combination with a primary sealant of the butyl family called poly-isobutylene. Polysulfide keeps its shape, elasticity and memory for great temperature differentials.

The inventors herein postulate some reasons for the limited access of better products in the markets. The inventors, however, do not wish to be bound by theory and are not specialists on market survey.

Most of the aforementioned methods to better insulating performance of window assemblies have increased the cost of manufacturing.

Most of the aforementioned methods to better insulating performance of window assembly have also increased the cost of materials.

Some of the aforementioned methods to better insulating performance of window assembly have additionally increased weight.

SUMMARY OF THE INVENTION

The invention is based on the following objects: to produce a spacer at low cost; improve insulation capacity of multi-pane assemblies, make the spacer easy to utilize with standard assembly techniques, and, to have a final product still adaptable to a variety of applications.

The present invention addresses insulating performance; durability under extremes of temperature; better adhesion characteristics; resistance to condensation at very low temperature; strength of the window assembly; the cost of manufacturing; and the cost of materials.

The present invention has the primary object of providing an insulating spacer having an elongated configuration.

It is still another object of the present invention to provide a spacer having means for mechanically locking in place a tongue with a protrusion made from the body innermost surface by punching, cutting, melting, shaping and drilling, to the matching necked-down groove width and a groove depth intermediate the bottom of the groove and the open mouth of the groove in the area opposite to the innermost surface, said tongue and groove having matching cross-sectional shapes which upon mating provide a substantial self-relieved interlocking fit therewith.

It is another object of the present invention to provide an innovative spacer to improve insulation or multi-pane window systems of very high thermal insulation performance.

It is another object of this invention to address the above noted deficiencies of the prior art.

It is still another object of this invention to provide an innovative spacer which can be incorporated into multi-pane window systems while maintaining a low cost of manufacturing.

It is a further object of this invention to maintain a low cost of material and still achieve today's need for greater insulation.

Other objects, advantages and novel features of the invention spacer will be described in the following specifications and claims, and, will become apparent to those of standard skill in the art or may be learned by practice of the invention.

According to the present invention, part of the solution is in the extra adherence surface built into the spacer side during extrusion or by any other techniques giving the same results and also the use of polyvinyl chloride with mineral additive. Altogether proper mechanical specifications are provided to utilize this invention, particularly with glass in a multi-pane glazing structure comprising at least two substantially parallel sheets of glazing held in spaced relationship to each other by a peripheral spacer frame. Polyvinyl chloride with the appropriate mineral filler gives excellent structural strength of assembly and good MVTR. Similar to aluminum for its mechanical qualities, it facilitates precise mounting for small tolerance assembly width and a stable assembly for a large range of temperature.

The spacer of the present invention is less expensive to produce than most polymeric spacers on the market.

This spacer can make a complete frame (locked in the corners) without using parts other than itself with proper cutting of its surfaces.

This spacer can make a complete frame at any angle without using parts other than itself with proper cutting of its surfaces and by welding (or catalysis, gluing or other equivalent) the locked assembly.

This spacer can make a complete frame using mechanical joint for corner.

This spacer can make a complete frame by welding (or catalysis, gluing or other equivalent), its ends precut at any angle degree.

This spacer can be utilized in different types of multi-pane window assemblies of high thermal insulation performance utilizing special features such as low heat conductance gas or sheets of transparent plastic or other means of increasing the overall insulation quality of the assembly.

The invention is explained in the following text with reference to preferred embodiments which are shown in the accompanying drawings.

DESCRIPTION OF THE PREFERRED EMBODIMENTS

For insulated spacers, the modified and improved qualities of polyvinyl chloride with a mineral additive and the novel cross section shape of the spacer of the present invention make it possible to manufacture insulated spacers resulting in five main improvements.

One improvement is higher strength and stiffness of the material, rendering possible the novel type of side increasing the area of contact between the invention spacer and the sealant. That will be more precisely described hereinbelow. It also makes it possible to lay down the spacer frame on the glass or any other type of panes and to more easily make the sides of the spacer frame parallel to the edges of the glazing sheets thus speeding up the assembly process, as compared, let us say, with aluminum.

Another improvement is higher stability at high temperature and a long temperature range in which mechanical properties of elongation and stiffness of structure permit its easy utilization mainly with glass.

Thirdly a decrease in thermal conductivity is possible, thus reducing drastically the risk of condensation on the inner surface of a multi-pane assembly.

Figure 3:
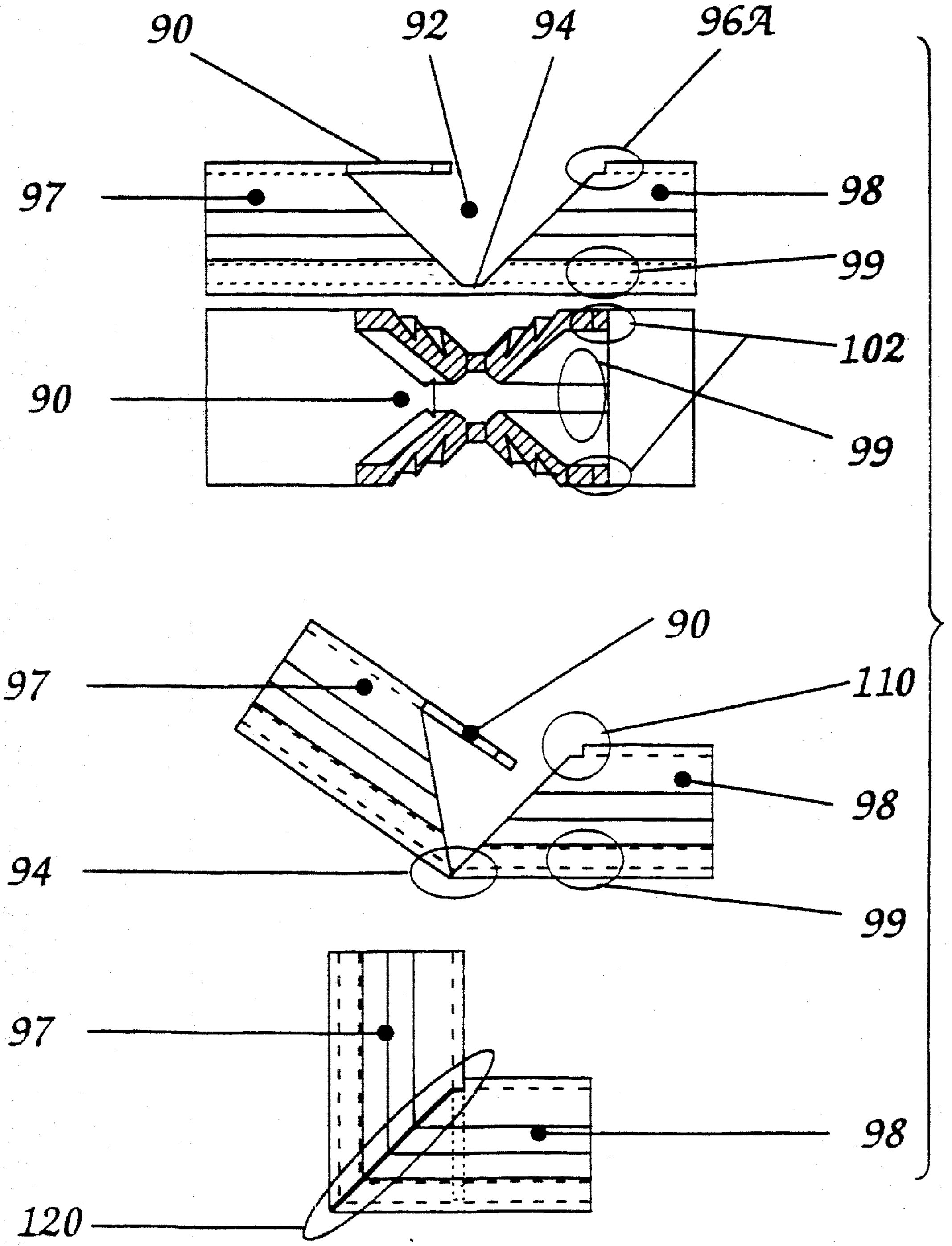
FIG. 3 shows the spacer in one of the possible corner configurations.

A fourth improvement is continuous folded corner stability at different % and/or type of mineral filler with the use of a novel type of locking mechanism FIG. 3 for ease of assembly manufacturing. Whatever the angle desired or the % and/or type of mineral filler utilized it is always possible to obtain a stable corner structure of the spacer frame to facilitate manufacturing of the assembly. A continuous corner increases the durability of the sealed unit with lower moisture vapor transmission and a reduced low-conductive gas loss at the corners.

Figure 1A:
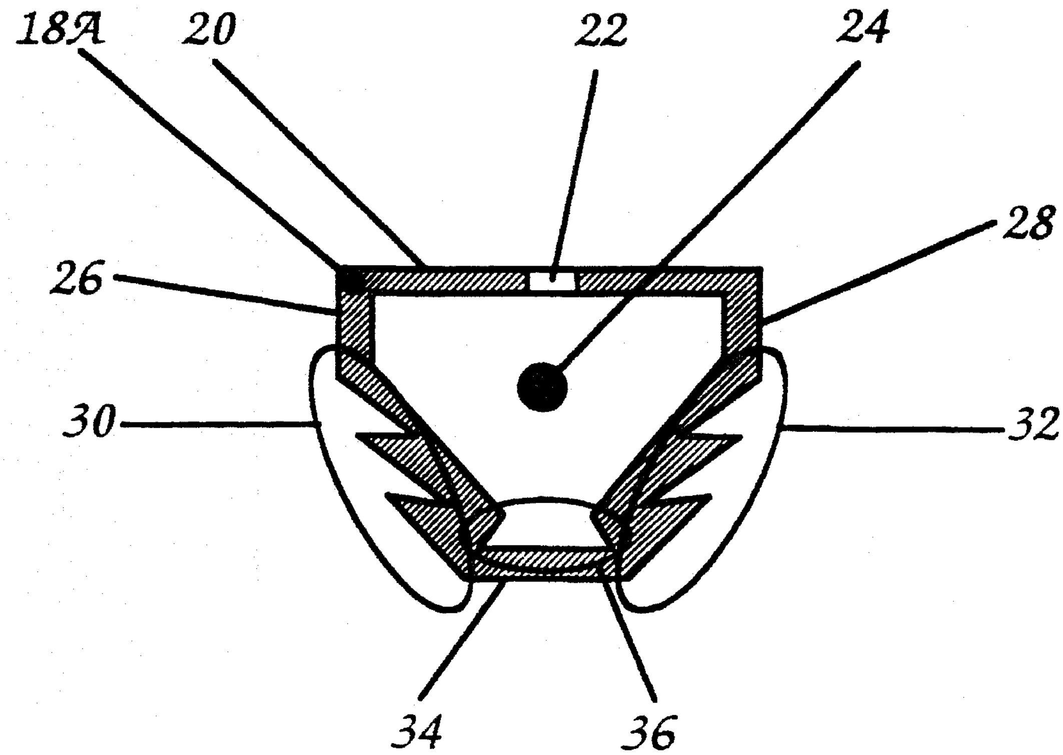
FIGS. 1A and 1B respectively show the preferred embodiment in cross sections and in a side view.

A fifth improvement is a stronger structure by improving the bond between the spacer and the panes it separates by increasing the area of contact between the spacer and the sealant with the novel type of spacer as shown in FIG. 1A, surface 34 and more specifically area 30 and 32, where the surface area increase is 115% and more. A preferable increase in surface area is around 150% but that is not limiting in view of the different possible increases available with the spacer of the present invention.

Figure 1B:
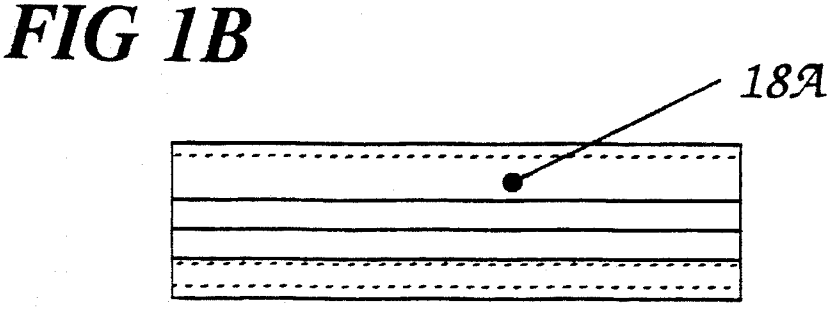

The spacer 18A shown in FIG. 1B, has a hollow shape with the following areas, surface 20 being the innermost of the assembly (FIG. 2A and 2B) in which holes 22 are made to permit humidity and water vapor in the area between the pane be absorbed by the desiccant put in space 24 and necked-down portion 36; sides 26 and 28 onto which panes can be applied directly or with a layer of sealant being provided; increased surface outermost sides areas 30 and 32 on which sealing material is applied, giving extra strength bounding between panes and the invention spacer; outermost surface 34 where folding occurs for the type of corner shown in FIG. 3 and where sealant is applied when utilized in the complete assembly. The longitudinal extent will be determined by the size and type of the assembly.

Areas 30 and 32 are made of one, two or more recesses, these depressions or indentations in the angled surfaces thereof providing an increase in contact surface for the sealing substance chosen for the particular assembly decided by the manufacturer. These indentations or depressions can be sharp or smooth and do not provide a place for cracks to start. The prior art uses a cavity in these areas to augment the quantity of sealant and/or facilitate its application. The surface increase in those case vary slightly around a maximum of 113%. The present invention attains a greater increase in contact surface with the sealing material than previous spacers (115% and above), good results being obtained at around 150% although this percentage does not limit the range covered by the invention spacer.

Figure 2A:
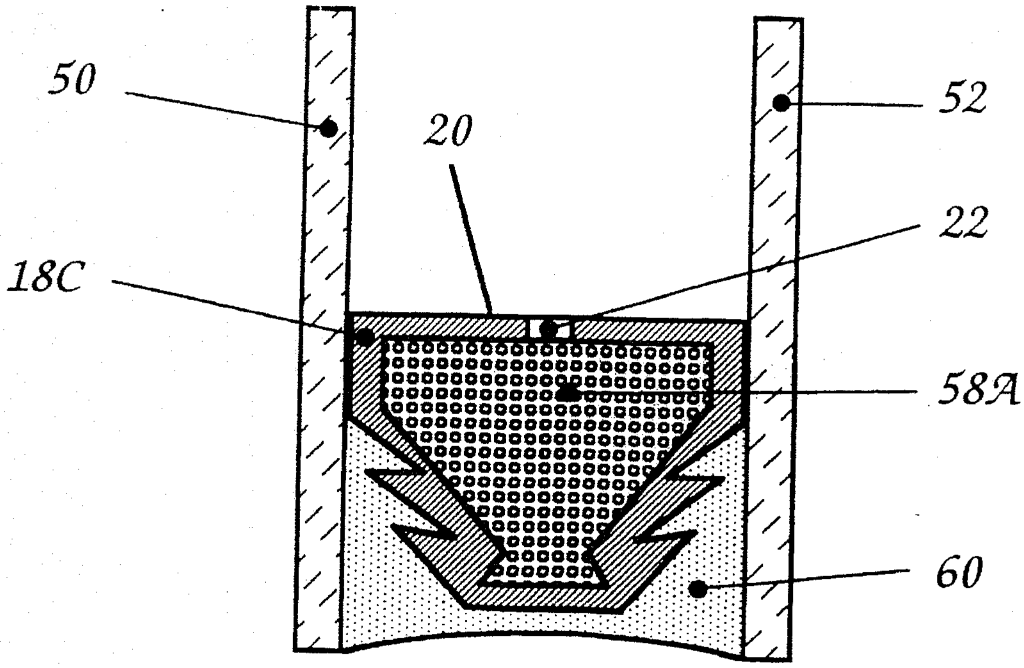
FIGS. 2A and 2B show two of many types of installations for the spacer of the present invention.

FIG. 2A shows a cross section of a single seal, a double glazed unit incorporating a hollow profile spacer 18C, in which desiccant material 58A has been placed. The spacer 18C is formed into a spacer frame as will be explained more fully hereinafter. The preassembled spacer frame is interposed between the first glazing layer and the second glazing layer, adjacent to the periphery of the panes. The outer sealant 60 can be any sealant with good barrier properties such as hot melt butyl, polysulfide or polyurethane and so with this design because of the lower permeability of the outer sealant, there is typically not the same need or requirement for the spacer to be made from PVC with outstanding barrier properties or alternatively to be coated with a separate moisture vapor and gas barrier film or coating. Though with our invention the spacer is of PVC with a mineral type filler giving an excellent MVTR any humidity or water vapor left between panes 50 and 52 is absorbed by the desiccant 58A through holes 22.

Sealant is applied in the outward facing channel around the periphery of the glazing sheets. The sealant must adhere to the back (FIG. 1, surfaces 30, 32 and 34) of the spacer and for certain types of compound, it may be necessary to treat, utilize a type of backing or prime the spacer to ensure good adhesion. The increased area of the surfaces 30 and 32 provide a firm connection between the sealing material and the body of the invention spacer.

Figure 2B:
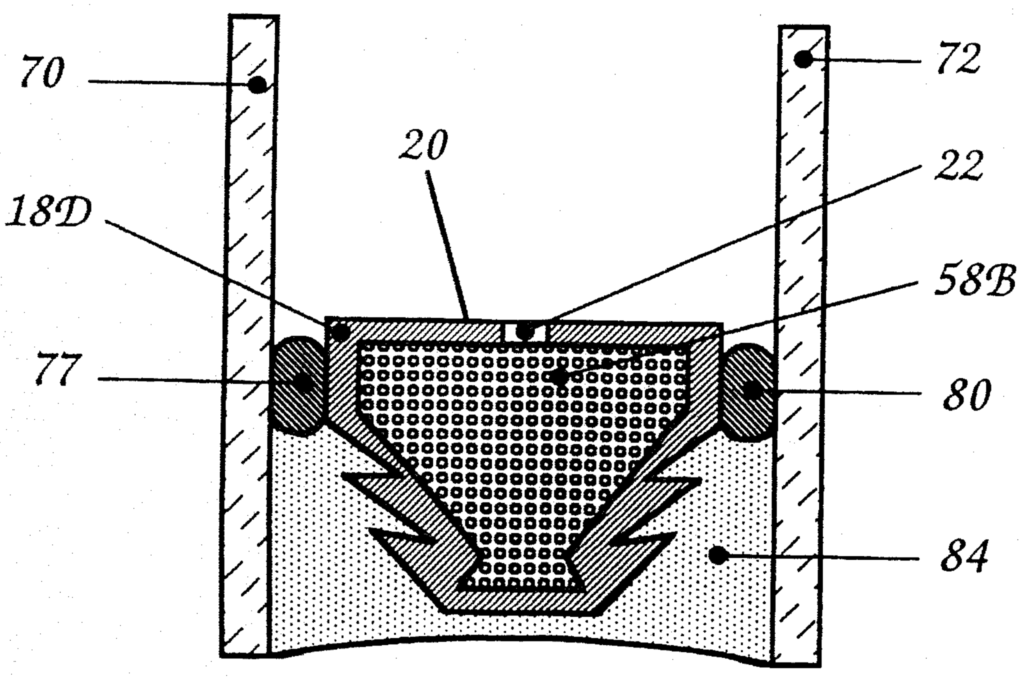

FIG. 2B shows a dual seal unit of PVC with a mineral filler spacer 18D. As with a conventional dual seal unit, beads of poly-isobutylene sealant 77 and 80 are applied to the sides of the hollow profile spacer 18D. Outer sealant 84 is applied to the outside most part of the assembly. The outer sealant 84 must adhere to the spacer 18D and to the panes 70 and 72. It may be necessary to treat, utilizing a type of backing, or prime the spacer 18D depending on the surface or the sealant utilized. Again the outer sealant 84 can be any sealant with good barrier properties such as hot melt butyl, polysulfide or polyurethane and so, with this design because of the lower permeability of the outer sealant, there is typically not the same need or requirement for the spacer to be made from PVC with outstanding barrier properties or alternatively to be coated with a separate moisture vapor and gas barrier film or coating. Though with the present invention the spacer is of PVC with a mineral type filler giving an excellent MVTR, and any humidity or water vapor left between panes 70 and 72 is absorbed by the desiccant material 58B through holes 76.

FIG. 3 shows a new type of mechanical joint not requiring any other piece of material than the extrusion itself. The extrusion is cut, punched, drilled, or by any other means prepared to have the following areas and parts. An area 92 permitting the spacer to be folded in area 94. Side 97 folds toward side 98 or vice versa.

Any type of tongue 90 with any type of protrusion at the end, that can be locked in the opposite locking area 99, or under the appropriately cut opposite folding surface 20 in the approximate areas 96 and 110 across the invention spacer, these possible locking combinations including a recess matching the tongue protrusion. This type of locking mechanism therefore does not require a special area 36 (FIG. 1) at the bottom of the invention spacer 18A. Areas 96, 102, 110 and joint 120 can be of any suitable type appropriate to the manufacturing and/or processing technique. As an example, one side 97 is attached to part 98, any corner angle is possible depending on area 92 shape, other locking area chosen (96,99,102,110,others) and tongue 90 length.

Such locking mechanism could also be described as an area with a cross-sectional shape providing for a necked-down groove 36 width at a groove depth intermediate the bottom of the groove providing a cross-section matching the tongue 90 end protrusion that when mated allows for a substantially self-relieved interlocking fit.

Figure 4A:
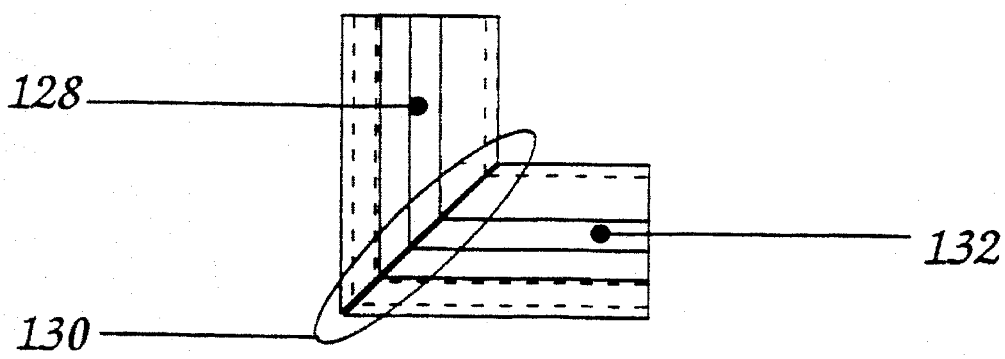
FIGS. 4A and 4B shows the spacer in two other possible corner configurations.
Figure 4B:
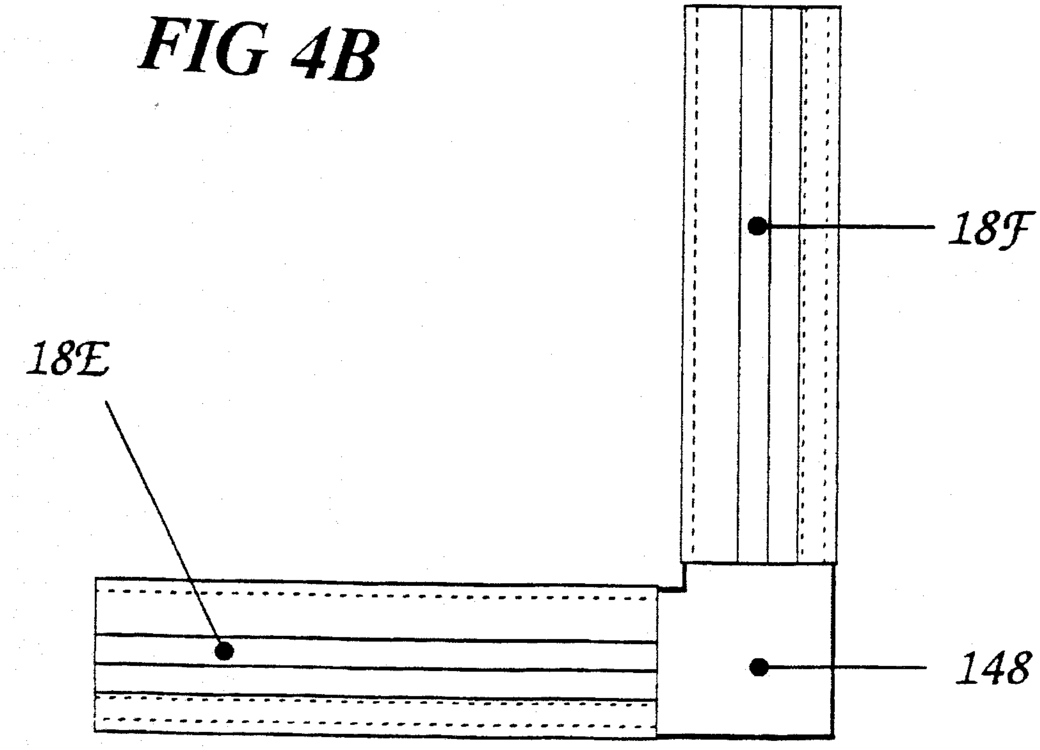

FIGS. 4A and 4B show other possible types of corners typical for that product. A length of spacer 128 cut to an angle and matched to another length of spacer 132 with the appropriate matching angle, are welded, glued or by any means other than mechanical held together at joint 130. Two lengths of spacer 18E and 18F are held together at any angle by a mechanical joint 148.

The following must be emphasized in summary. The embodiment of the invention herein illustrated presents a preferred form in composition thereof and should not be construed as limiting. The drawings described herein illustrate a very small sample of some of the possible design configuration where the invention spacer may be utilized to replace other types of spacer in multiple-glazed sealed units. Thus it is not limitative of all special cases and/or specific references of when the invention spacer may be utilized. It is not described herein but nonetheless important for those skilled in the art, that it is suggested that the invention spacer be used in conjunction with an appropriate sealing material to achieve required quality of the final multi-pane assembly. From all the above descriptions it will be apparent that there is thus provided a device of the character described which possess the particular features of advantages enumerated as desirable, but which, before the enumerated advantages, rendering the invention susceptible of modification in its proportions, form, detail construction and arrangement of parts without deviating from the principle involved, or sacrificing any of its advantages, or modes of putting the invention into effect in any assembly. Therefore any failure to describe such aspect is also not intended to create any limitation to the present invention. Any other aspects, advantages and modifications within the scope of the invention will be apparent to those skilled in the art to which the invention pertains.

We claim:

1. A multi-pane sealed unit comprising: glass panes or panel walls and an insulating spacer having an elongated configuration comprising:

a pair of side surface areas which are mirror images and having angled surfaces which are spaced apart so as to provide a greater contact surface with a sealing material;

a first surface and a second surface connected to said angled surfaces and enclosing an empty space running along a length portion of the spacer, said empty space having a cross-sectional shape with a necked-down portion in a groove that is intermediate a bottom portion of the necked-down groove and a widened portion of the groove opposite the first surface wherein the angled surfaces include one of a recess, a depression and an indentation;

a tongue with a protrusion made from said first surface by one of punching, cutting, melting, shaping and drilling and a mechanism locking said tongue to the necked-down portion at a groove depth intermediate the bottom of the groove and an open mouth of the groove in an area opposite the first surface, said tongue and said groove having matching cross-sectional shapes which upon mating provide a substantially self-relieved interlocking fit therewith wherein said spacer is interposed between one of said glass panes and panel walls and is positioned in layers of a multi-pane sealed unit.

2. A "multi-pane sealed unit" as claimed in claim 1, wherein said spacer comprises polyvinyl chloride with a mineral filler.

* * * * *